United States Patent
Moyer et al.

(10) Patent No.: US 11,714,912 B2
(45) Date of Patent: *Aug. 1, 2023

(54) ENCLAVE FORK SUPPORT (71) Applicant: Google LLC, Mountain View, CA (US)

(72) Inventors: Keith Moyer, Kirkland, WA (US); Uday Savagaonkar, Redmond, WA (US); Chong Cai, Kirkland, WA (US); Matthew Gingell, Woodinville, WA (US); Anna Sapek, Kirkland, WA (US)

(73) Assignee: Google LLC, Mountain View, CA (US)

(*) Notice: Subject to any disclaimer, the term of this patent is extended or adjusted under 35 U.S.C. 154(b) by 163 days.

This patent is subject to a terminal disclaimer.

(21) Appl. No.: 17/201,741

(22) Filed: Mar. 15, 2021

(65) Prior Publication Data
US 2021/0200883 A1 Jul. 1, 2021

Related U.S. Application Data (63) Continuation of application No. 16/153,039, filed on Oct. 5, 2018, now Pat. No. 10,949,547.

(51) Int. Cl.
G06F 21/60 (2013.01)
G06F 21/62 (2013.01)
(Continued)

(52) U.S. Cl.
CPC ........ *G06F 21/602* (2013.01); *G06F 21/6245* (2013.01); *H04L 9/0861* (2013.01); *H04L 9/14* (2013.01); *H04L 9/30* (2013.01)

(58) Field of Classification Search
CPC . G06F 21/602; G06F 21/6245; H04L 9/0861; H04L 9/14; H04L 9/30
(Continued)

(56) References Cited

U.S. PATENT DOCUMENTS 5,970,250 A 10/1999 England et al.
6,085,217 A 7/2000 Ault et al.
(Continued)

FOREIGN PATENT DOCUMENTS

KR 20090017538 A 2/2009
KR 20170120096 A 10/2017
KR 20180060876 A 6/2018

OTHER PUBLICATIONS

Jinyuan Li,; Secure Untrusted Data Repository (SUNDR); USENIX: YEAR:2004; pp. 121-136.*

(Continued)

*Primary Examiner* — Monjur Rahim
(74) *Attorney, Agent, or Firm* — Lerner David LLP (57) ABSTRACT A fork support is provided for duplicating an application running inside an enclave entity. In this regard, a request to duplicate an application running inside a first enclave may be received by one or more processors of a host computing device of the first enclave. A snapshot of the first enclave including the application may be generated. The snapshot may be encrypted with a snapshot key and copied to untrusted memory of the host. A second enclave may be generated. The snapshot key may be sent from the first enclave to the second enclave through a secure communication channel. The encrypted snapshot may be copied from the untrusted memory of the host into the second enclave. The encrypted snapshot may be decrypted inside the second enclave with the snapshot key.

20 Claims, 7 Drawing Sheets (51) Int. Cl.
 *H04L 9/08* (2006.01)
 *H04L 9/30* (2006.01)
 *H04L 9/14* (2006.01)

(58) Field of Classification Search
 USPC .......................................... 712/171; 713/171
 See application file for complete search history.

(56) References Cited

U.S. PATENT DOCUMENTS

| | | | |
|---|---|---|---|
| 6,769,119 | B1 | 7/2004 | England et al. |
| 9,442,752 | B1 | 9/2016 | Roth et al. |
| 10,223,538 | B1* | 3/2019 | Cignetti .................. G06F 21/53 |
| 10,877,785 | B2* | 12/2020 | Costa .................... G06F 21/602 |
| 10,924,275 | B1* | 2/2021 | Kumar ...................... H04L 9/14 |
| 2004/0096058 | A1* | 5/2004 | Cho .......................... G09C 5/00 380/28 |
| 2005/0005103 | A1* | 1/2005 | Atkin ...................... G06F 21/52 713/165 |
| 2011/0246767 | A1* | 10/2011 | Chaturvedi ............. G06F 21/53 718/1 |
| 2011/0283113 | A1* | 11/2011 | Moffat .................. G06F 21/602 713/189 |
| 2015/0052596 | A1* | 2/2015 | Ayanam .................. H04W 4/38 726/8 |
| 2015/0371063 | A1* | 12/2015 | Van Antwerpen ....... G09C 1/00 713/190 |
| 2016/0148001 | A1* | 5/2016 | Bacher .................... G06F 9/542 713/189 |
| 2016/0246720 | A1 | 8/2016 | Pandey et al. |
| 2016/0283409 | A1* | 9/2016 | Pandey .................. G06F 21/53 |
| 2017/0289109 | A1* | 10/2017 | Caragea ................ H04L 9/3263 |
| 2018/0137294 | A1* | 5/2018 | Van Antwerpen .... G06F 3/0661 |
| 2019/0095879 | A1 | 3/2019 | Eyal et al. |
| 2019/0213319 | A1* | 7/2019 | Gerebe .................. H04L 63/12 |
| 2019/0362083 | A1* | 11/2019 | Ortiz ..................... H04L 9/3247 |
| 2019/0369262 | A1* | 12/2019 | Fernandez Hernandez ................. H04L 9/3242 |
| 2020/0012527 | A1* | 1/2020 | Hartsock ............... H04L 9/0825 |
| 2020/0204346 | A1 | 6/2020 | Trevethan |

OTHER PUBLICATIONS

Office Action for Korean Patent Application No. 10-2021-7007581 dated Jul. 4, 2022. 6 pages.
First Examination Report for Indian Patent Application No. 202147000158 dated Jan. 3, 2022. 7 pages.
Chia-Che Tsai et al. "Graphene-SGX: A Practical Library OS for Unmodified Applications on SGX." The Proceedings of the 2017 USENIX Annual Technical Conference (USENIX ATC '17). USENIX Association. Jul. 12-14, 2017. pp. 645-658. Santa Clara, CA, USA. ISBN 978-1-931971-38-6. Retrieved from the Internet: <https://www.usenix.org/conference/atc17/technical-sessions/presentation/tsai>.
Chia-Che Tsai. "A Library Operating System for Compatibility." A Dissertation presented by Chia-Che Tsai to The Graduate School in Partial Fulfillment of the Requirements for the Degree of Doctor of Philosophy in Computer Science. Stony Brook University, New York. Dec. 2017. 201 pages.
Gu J, Hua Z, Xia Y, Chen H, Zang B, Guan H, Li J. Secure live migration of SGX enclaves on untrusted cloud. In2017 47th Annual IEEE/IFIP International Conference on Dependable Systems and Networks (DSN) Jun. 26, 2017 (pp. 225-236). IEEE.
International Search Report including Written Opinion for PCT/US2019/051219 dated Nov. 15, 2019.
James Litton et al. "Light-weight Contexts: An OS Abstraction for Safety and Performance." 12th USENIX Symposium on Operating Systems Design and Implementation. USENIX Association. Savannah, GA, USA. Nov. 2-4, 2016. pp. 49-64.
Mustafa Al-Bassam et al. "Airtnt: Fair Exchange Payment for Outsourced Secure Enclave Computations." May 16, 2018 Conference'17, Jul. 2017, Washington, DC, USA. 12 pages.
Notice of Allowance for Korean Patent Application No. 10-2021-7007581 dated Jan. 6, 2023. 2 pages.

* cited by examiner

ENCLAVE FORK SUPPORT

CROSS-REFERENCE TO RELATED APPLICATIONS

The present application is a continuation of U.S. patent application Ser. No. 16/153,039, filed on Oct. 5, 2018, the disclosure of which is incorporated herein by reference.

BACKGROUND

Software applications may store sensitive data such as passwords, account numbers, financial and health records. Various safeguards may be used to protect such sensitive data, for example, a host operating system may prevent unauthorized users from accessing operating system resources, and the application may encrypt sensitive data, but the application has no safeguard against processes having higher privileges, including the host operating system itself. Secured execution technologies provide the capability to run applications without requiring trust in the system administrator or the system software itself, such as a host operating system or hypervisor ("host"). In order to do so, an enclave may be used. An enclave may be a "protected environment" within an untrusted host in which data within the enclave is isolated from the rest of the system, including the untrusted host. Code and data inside the enclave are not visible and cannot be manipulated by untrusted processes outside the enclave, including the untrusted host.

In some instances, for an application to run properly inside the enclave, the application may require functionalities ordinarily provided by the host in order to execute certain function calls. For instance, fork( ) is a POSIX function call used in many common applications. When called, fork( ) duplicates an application, including its memory states, and, from that point on, the duplicated application runs separately from the original application. For example, a web browser application may duplicate instances of itself. Fork( ) is generally implemented using functionalities provided by the host.

BRIEF SUMMARY

The present disclosure provides for receiving, by one or more processors of a host computing device of a first enclave, a request to duplicate an application running inside the first enclave; generating, by the one or more processors, a snapshot of the first enclave including the application; encrypting, by the one or more processors, the snapshot inside the first enclave with a snapshot key; copying, by the one or more processors, the encrypted snapshot from the first enclave to untrusted memory of the host; generating, by the one or more processors, a second enclave; sending, by the one or more processors, the snapshot key from the first enclave to the second enclave through a secure communication channel; copying, by the one or more processors, the encrypted snapshot from the untrusted memory of the host into the second enclave; and decrypting, by the one or more processors, the encrypted snapshot inside the second enclave with the snapshot key.

The method may further comprise creating, by the one or more processors, an entry for the first enclave, the entry allowing a snapshotting thread to enter the first enclave from the host, wherein the snapshot is taken by the snapshotting thread inside the first enclave. The method may further comprise generating, by the one or more processors, an entry barrier for the entry created for the first enclave, and wherein the entry barrier prevents host-side threads other than the snapshotting thread from entering the first enclave.

The method may further comprise generating, by the one or more processors, a fork indication inside the first enclave indicating that one snapshot can be taken of the first enclave, and wherein the fork indication permits only one snapshotting thread to take a snapshot. The method may further comprise removing, by the one or more processors, the fork indication inside the first enclave in response to the one snapshotting thread entering the first enclave, wherein the one snapshot is taken in response to the fork indication being removed.

Copying the encrypted snapshot from the untrusted memory of the host into the second enclave may further comprise copying, by the one or more processors, the encrypted snapshot from the first enclave to a first process of the host, and wherein the first enclave may be generated using the first process. Copying the encrypted snapshot from the untrusted memory of the host into the second enclave may further comprise copying, by the one or more processors, the encrypted snapshot from the first process to a second process of the host, wherein the second enclave being generated using the second process; and copying, by the one or more processors, the encrypted snapshot from the second process into the second enclave. The second process may be generated by calling a host-side fork function on the first process.

The method may further comprise generating, by the one or more processors, a first key pair inside the first enclave, the first key pair includes a first public key and a first private key; generating, by the one or more processors, a second key pair inside the second enclave, the second key pair includes a second public key and a second private key; generating, by the one or more processors, a secret key inside the first enclave using the first private key and the second public key; and generating, by the one or more processors, the secret key inside the second enclave using the second private key and the first public key, wherein the secure communication channel is established between the first enclave and the second enclave using the secret key.

The method may further comprise generating, by the one or more processors, a first assertion inside the first enclave, the first assertion being bound to the first public key; sending, by the one or more processors, the first assertion to the second enclave; verifying, by the one or more processors, that the first assertion is bound to the first public key; generating, by the one or more processors, a second assertion inside the second enclave, the second assertion being bound to the second public key; sending, by the one or more processors, the second assertion to the first enclave; and verifying, by the one or more processors, that the second assertion is bound to the second public key, and wherein the generating the secret key is based on the first assertion and the second assertion being verified.

The method may further comprise generating, by the one or more processors, a first assertion inside the first enclave, the first assertion being bound to the first public key; sending, by the one or more processors, the first assertion to the second enclave; verifying, by the one or more processors, a first identity of the first enclave using the first assertion; generating, by the one or more processors, a second assertion inside the second enclave, the second assertion being bound to the second public key; sending, by the one or more processors, the second assertion to the first enclave; and verifying, by the one or more processors, a second identity of the second enclave using the second assertion, and wherein the generating the secret key is based on the first identity and the second identity being verified. The first identity may be identical to the second identity.

The method may further comprise creating, by the one or more processors, an entry for the first enclave, the entry allowing an attesting thread to enter the first enclave from the host, and wherein the first assertion is generated in response to a request by the attesting thread. The method may further comprise creating, by the one or more processors, an entry for the first enclave, the entry allowing an authenticating thread to enter the first enclave from the host, and wherein the second assertion is verified by the first enclave in response to a request by the authenticating thread.

The method may further comprise generating, by the one or more processors, a first key pair inside the first enclave, the first key pair includes a first public key and a first private key; generating, by the one or more processors, a second key pair inside the second enclave, the second key pair includes a second public key and a second private key; generating, by the one or more processors, a secret key inside the first enclave using the first private key and the second public key; encrypting, by the one or more processors, the snapshot key in the first enclave using the secret key. The method may further comprise creating, by the one or more processors, an entry for the first enclave, the entry allowing an encrypting thread to enter the first enclave from the host to encrypt the snapshot key with the secret key.

The method may further comprise generating, by the one or more processors, the secret key inside the second enclave using the first public key and the second private key; and decrypting, by the one or more processors, the encrypted snapshot key inside the second enclave using the secret key. The method may further comprise creating, by the one or more processors, an entry for the second enclave, the entry allowing a restoring thread to enter the second enclave from the host, and wherein the snapshot key is decrypted by the restoring thread inside the second enclave.

The first enclave and the second enclave may have a same virtual memory address.

The disclosure further provides for a system comprising a memory storing a first enclave; and one or more processors in communication with the memory, the one or more processors configured to receive a request to duplicate an application running inside the first enclave; generate a snapshot of the first enclave including the application; encrypt the snapshot inside the first enclave with a snapshot key; copy the encrypted snapshot from the first enclave to an untrusted portion of the memory outside of the first enclave; generate a second enclave; send the snapshot key from the first enclave to the second enclave through a secure communication channel; copy the encrypted snapshot from the untrusted memory into the second enclave; and decrypt the encrypted snapshot inside the second enclave with the snapshot key.

DETAILED DESCRIPTION

Overview

The technology relates generally to implementing fork( ) for applications running inside secure enclaves. As mentioned above, code and data inside the enclave are not visible and cannot be manipulated by untrusted processes of the untrusted host, thus the untrusted host cannot access the application inside the enclave to provide the functionalities required for fork( ). Implementing fork( ) for an application running inside an enclave therefore poses special challenges. Further, to ensure that the duplicated application can run in the same secure environment as the original application, the enclave itself also needs to be duplicated. Still further, the duplication process must ensure that data inside the enclave do not leak outside the enclave at any point.

In this regard, enclave fork support may be provided to address these challenges. Implementation of fork( ) using the fork support may begin with a request from an application running inside a first enclave to duplicate itself. The first enclave may be hosted by a first host process. In order to make a duplicate of the application inside the first enclave, a snapshot of the first enclave including the application inside the first enclave may be generated. In this regard, a thread running the application inside the first enclave may exit the first enclave to request a host-side function to help perform the fork. A new thread from the host may then enter in a new thread control structure reserved for the fork support in order to take the snapshot inside the first enclave. Once generated, the snapshot may be encrypted with a snapshot key inside the first enclave to ensure that, when the snapshot is copied outside of the first enclave, the untrusted host cannot access data in the snapshot.

In some examples, the first enclave may set one or more flags to ensure security and accuracy of the snapshot. For instance, to prevent other host-side threads from entering the first enclave and modify memory states inside the first enclave while a snapshot is taken, which would cause inaccuracies in the snapshot (i.e., not exact copies), the first enclave may create an entry barrier. The entry barrier may only allow one snapshotting thread to enter the first enclave, which reduces the likelihood that an untrusted thread may sneak in to take a snapshot.

For another instance, to prevent leakage of sensitive data within the first enclave, the first enclave needs to indicate that the fork( ) request actually originated from an application inside the first enclave, and not from an untrusted process of the untrusted host. In this regard, a fork indication may be generated inside the first enclave to indicate that fork( ) is in progress in the first enclave, and that a snapshot may be taken. The fork indication may be removed by the first snapshotting thread that enters the first enclave, which is then allowed to take the snapshot. This way, it is ensured that only one snapshot can be taken by only one snapshotting thread, and that another untrusted thread, even if somehow entered into the enclave, cannot take a second snapshot.

Next, the encrypted snapshot may be copied to the untrusted memory of the untrusted host, such as untrusted memory allocated to the first host process, so that functionalities of the untrusted host may support further steps of fork( ). In this regard, the first host process may be forked, creating a second host process that is a child of the first host process. Because the second host process is a duplicate of the first host process, untrusted memory allocated to the second host process also includes the encrypted snapshot. An insecure communication channel may be established between the two host processes, and the second host process may generate a second enclave, which may be created with the same identity and same virtual memory address as the first enclave.

In order for the second enclave to decrypt the encrypted snapshot, the first enclave needs to send the snapshot key to the second enclave through a secure communication channel. As such, the secure communication channel may be established upon mutual attestation and authentication by the two enclaves. The attestation and authentication may be performed through the insecure communication channel between the two host processes. In some examples, during attestation, each enclave may generate a respective key pair including a respective public key and a respective private key, and may then each generate a respective assertion bound to the respective public key. As mentioned above, if the two enclaves were created with the same identity, during authentication, each enclave would be able to verify that the other enclave is making a valid assertion of the same identity.

In some examples, the first and second enclaves may generate a shared secret sending and receiving data through the secure communication channel. For example, the first and second key pairs may be Diffie-Hellman key pairs, which means that a shared secret between the two enclaves can be generated using a public key and a private key from each enclave, which may then be used as an input into a key derivation function to derive the same symmetric secret key. As such, using the symmetric secret key, the snapshot key may be encrypted inside the first enclave using the secret key, and decrypted inside the second enclave using the secret key. Once the second enclave has the snapshot key, the encrypted snapshot may be copied into the second enclave, the second enclave can then decrypt the encrypted snapshot, and access the data inside the snapshot to make itself a duplicate of the first enclave, including the application running inside the first enclave.

The features described herein provide a framework to implement fork( ) for an application running inside an enclave and thereby provide enclave fork support when the host would not actually have access to the information within the enclave and therefore would not be able to otherwise implement fork( ). In addition, various safeguards are included to allow an untrusted host to assist in the forking process, without ever allowing the host access to unencrypted data inside the enclave. By duplicating the enclave, the framework enables the duplicated application to run separately from the original application inside the same secure environment.

Example Systems

Figure 1:
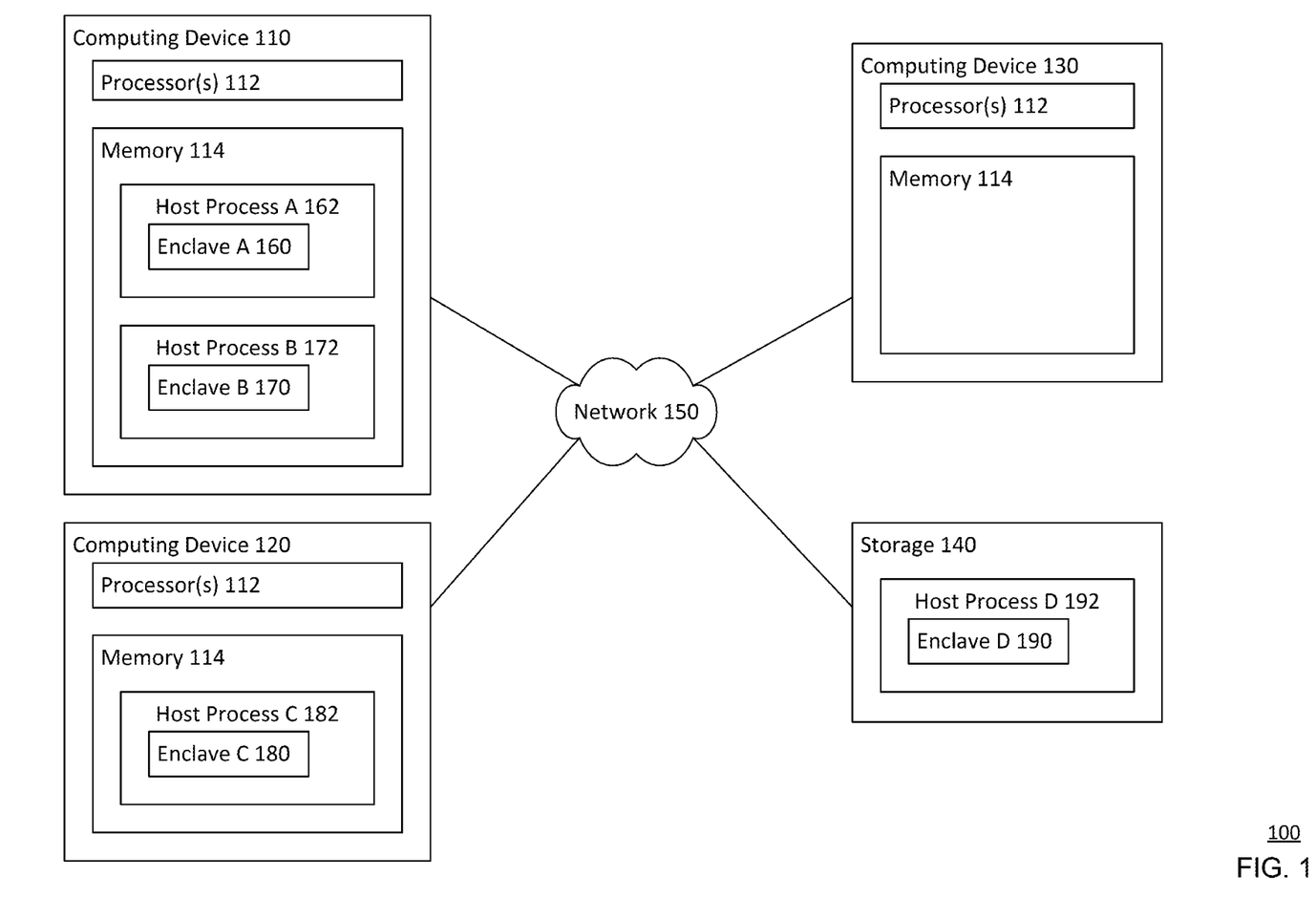
FIG. 1 is a functional diagram of an example system in accordance with aspects of the disclosure.

FIG. 1 includes an example enclave system 100 in which the features described herein may be implemented. It should not be considered as limiting the scope of the disclosure or usefulness of the features described herein. In this example, enclave system 100 can include computing devices 110, 120, 130 and storage system 140 connected via a network 150. Each computing device 110, 120, 130 can contain one or more processors 112, memory 114 and other components typically present in general purpose computing devices.

Although only a few computing devices and a storage systems are depicted in the system 100, the system may be expanded to any number of additional devices. In addition to a system including a plurality of computing devices and storage systems connected via a network, the features described herein may be equally applicable to other types of devices such as individual chips, including those incorporating System on Chip (Soc) or other chips with memory, that may include one or more enclaves.

Memory 114 of each of computing devices 110, 120, 130 can store information accessible by the one or more processors 112, including instructions that can be executed by the one or more processors. The memory can also include data that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data may be retrieved, stored or modified by the one or more processors 112 in accordance with the instructions. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

Each of the computing devices 110, 120, 130 can be at different nodes of a network 150 and capable of directly and indirectly communicating with other nodes of network 150. Although only a few computing devices are depicted in FIG. 1, it should be appreciated that a typical system can include a large number of connected computing devices, with each different computing device being at a different node of the network 150. The network 150 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Like the memory discussed above, the storage system 140 may also store information that can be accessed by the computing devices 110, 120, 130. However, in this case, the storage system 140 may store information that can be accessed over the network 150. As with the memory, the storage system can include any non-transitory type capable of storing information accessible by the processor, such as a hard-drive, memory card, ROM, RAM, DVD, CD-ROM, write-capable, and read-only memories.

In this example, the instructions of each of computing devices 110, 120, 130 may include one or more processes. These processes may define or "load" one or more enclaves, such as Enclave A 160, Enclave B 170, Enclave C 180, Enclave D 190 within memory, either locally at memory 114 or remotely at the storage system 140. A process that loads an enclave may be considered a "host process" of that enclave. For example, as shown, Host Process A 162 hosts Enclave A 160, Host Process B 172 hosts Enclave B 170, Host Process C 182 hosts Enclave C 180, and Host Process D 192 hosts Enclave D 190. Each enclave may also be "hosted" by the hardware on which the enclave is stored. For instance, computing device 110 may be a host computing device for Enclave A 160 and Enclave B 170, and computing device 120 may be a host computing device of Enclave C 180. As discussed in detail below with respect to example methods, two host processes may establish an insecure communication channel between each other, for example to facilitate attestation and authentication between the enclaves inside these host processes.

Each enclave can be used to store data and instructions while at the same time limit the use of such data and instructions by other applications. For instance the data may include sensitive information such as passwords, credit card data, social security numbers, or any other information that a user would want to keep confidential. And, as discussed further below, the instructions may be used to limit the access to such data. Although computing device 110 includes only two enclaves, computing device 120 includes only 1 enclave, computing device 130 includes no enclaves, and storage system 140 includes only 1 enclave, any number of enclaves may be defined with the memory of the computing devices 110, 120, storage system 140, or any other devices of system 100.

To protect code and data inside the enclave yet still allow the enclaves to interact with the host and use host resources and functionalities, the enclave may have one or more predefined entry points for code to enter and exit the enclave. An interface may be established at the enclave boundary such that a host-side function outside the enclave may call an enclave interface function inside the enclave, which may allow a thread from the host to enter the enclave through a particular entry point. Conversely, an enclave interface function inside the enclave may call a host-side function outside the enclave for a thread inside the enclave to exit the enclave. For example, for enclaves implemented on an INTEL® SGX system, such enclave interface functions may be referred to as "ecalls," and such host-side functions may be referred to as "ocalls."

When created by the host for running an application inside the enclave, a thread may have a data structure containing metadata, the data structure may define specific entry points for the thread to enter the enclave. For example, for an SGX system, such a data structure is called a "thread control structure (TCS)." The TCS may define one or more entry points for a thread to enter into the enclave. The enclave can only be entered through these entry points. A specific TCS may be reserved for forking operations and may be assigned to the thread responsible for fork-related operations, such as taking and restoring snapshots. For instance, an INTEL® SGX SDK system may utilize a specific TCS for untrusted threads, such as utility_thread, which may be used to ensure that the thread is reserved for forking operations.

The ecalls may include any number of different functions, such as "enter and initialize" (for sending code to take system resources to run an application inside an enclave) "enter and finalize" (for relinquishing system resources no longer needed in the enclave), "enter and run" (for executing functions of the application inside the enclave), "enter and donate thread," (for host to provide a thread to the enclave), "enter and handle signal" (for handling signals sent between enclaves or between the host and the enclave), "enter and destroy" (for terminating an enclave), etc.

Specific ecalls may be created in particular to support fork. For example, "EnterAndTakeSnapshot" may allow a thread on the host to enter an enclave to take a snapshot of memory states of the enclave. For another example, "EnterAndAttest" may allow a thread on the host to enter an enclave to request an enclave to generate assertions, while "EnterAndAuthenticate" may allow a thread on the host to enter an enclave to request that the enclave verify assertions of identity. For yet another example, "EnterAndEncrypt" may allow a thread on the host to enter an enclave to encrypt data. For still another example, "EnterAndRestore" may allow a thread on the host to enter an enclave to decrypt and restore a snapshot.

For the entry for EnterAndTakeSnapshot, additional safeguards may be needed so as to prevent other threads from entering and changing the memory states of the enclave while a snapshot is being taken, as well as to prevent unauthorized threads from entering and taking a snapshot of the memory states inside the enclave. As such, entry barriers and fork indications may be created to selectively allow some threads to enter through EnterAndTakeSnapshot, and/or limit the number of snapshots allowed, which are described in further detail below.

Each of these enclaves may be considered an "entity" of the enclave system 100. As an entity, the enclaves may have or be used to generate identities and assertions that may enable attestation and authentication in an identity framework of the enclave system 100. An assertion may be a cryptographically-verifiable claim of an identity.

To enable the operations needed for implementing attestation and authentication in the identity framework, at least two roles or programming interfaces, including a generator and a verifier may be employed at each enclave in the enclave system 100. For instance, turning to FIG. 2, enclaves 160, 170, 180, 190 each include one or more Assertion Generators 210, 212, 214, 216. Each enclave may include different types of Assertion Generators for different types of assertions as each type of identity may have many different types of assertions. An Assertion Generator may include instructions for generating assertions on behalf of entities in the enclave system. In this regard, each Assertion Generator may provide an operation that generates an assertion that makes a claim of an identity. Assertions generated by these operations may be cryptographically-verifiable.

Figure 2:
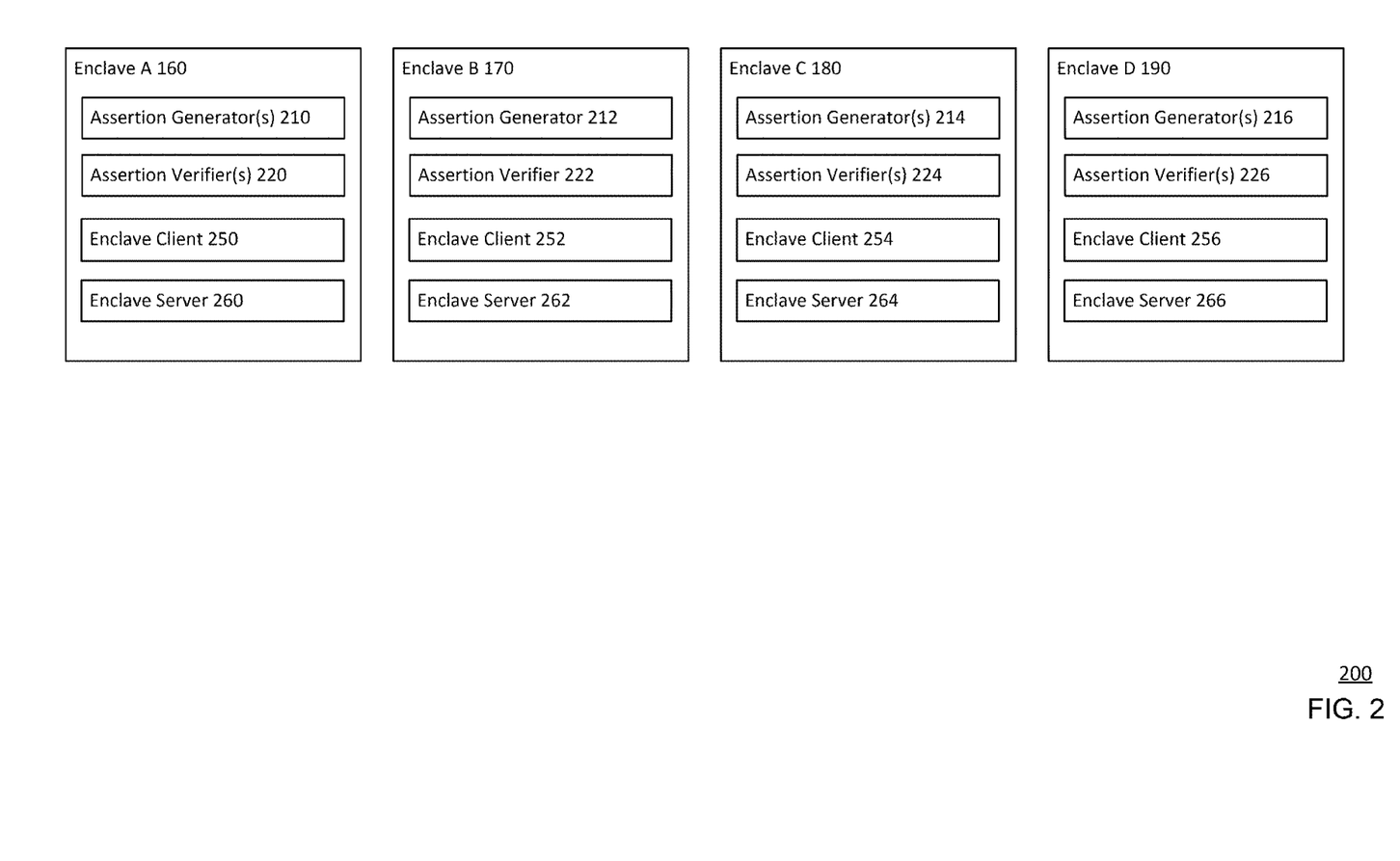
FIG. 2 is a functional diagram of aspects of the system of FIG. 1.

In addition, a verifier can verify the assertion to determine whether the claim of an assertion is valid. For instance, each enclave 160, 170, 180, 190 includes one or more Assertion Verifier(s) 220, 222, 224, 226. The Assertion Verifier may include instructions for verifying assertions, and extracting identities out of verified assertions. The Assertion Verifier may provide an operation that verifies an assertion of a specific type of identity. In that regard, an enclave may include different Assertion Verifiers for different types of identities. In operation, given an assertion, an Assertion Verifier may determine whether or not the claim of an identity in an assertion is valid. As an example, the Assertion Verifier may return a Boolean response (i.e. a yes/no answer) that indicates whether the assertion can be verified. If the assertion is valid and is verified, the Assertion Verifier may also extract the identity from the assertion. As discussed in detail below with respect to example methods, two enclaves may use the Assertion Generators and the Assertion Verifiers to generate assertions and verify each other's identities before establishing a secure communication channel.

Each of the enclaves may also include an enclave client 250, 252, 254, 256 and an enclave server 260, 262, 264, 266. The enclave clients may include instructions for generating remote procedure calls (RPCs) to other enclaves or entities within the enclave system 100. Similarly, the enclave server may include instructions for receiving and responding to requests generated by or from other enclaves or entities within the enclave system. As an example, the RPC may be implemented as gRPC, which uses HTTP for message framing. As discussed in below with respect to example methods, two enclaves may use the enclave clients and servers to send and receive data as RPCs over a secure communication channel.

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 3:
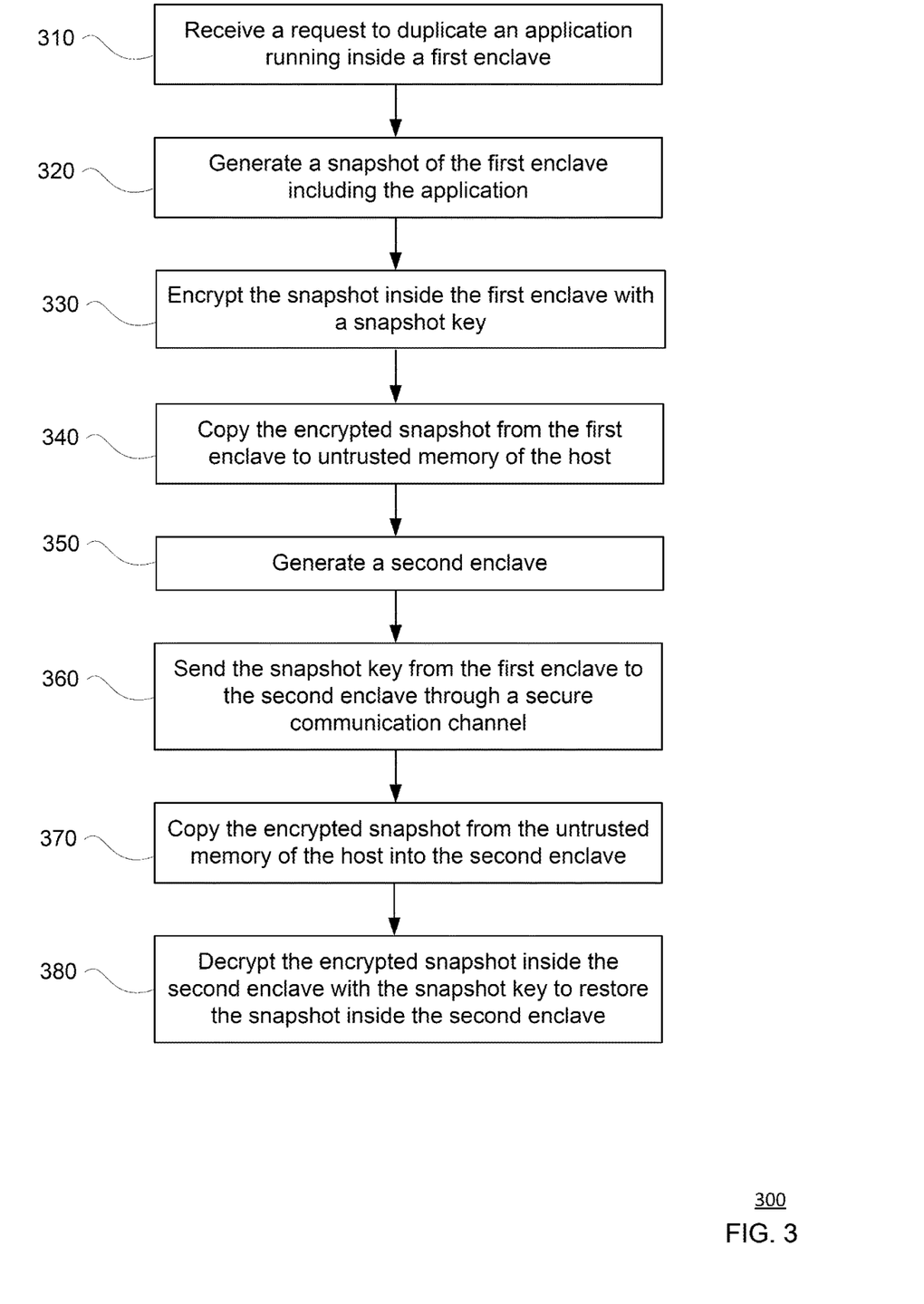
FIG. 3 is a flow diagram in accordance with aspects of the disclosure.

FIG. 3 shows an example flow diagram 300 of forking an application running in a first enclave to generate a duplicate instance of the application running in a second enclave. The flow diagram 300 may be performed by one or more processors, such as the one or more processors 112 of computing devices 110. For example, the one or more processors 112 of computing devices 110 may perform flow diagram 300 to implement fork( ) for an application running in Enclave A 160, in order to generate a duplicate application running in Enclave B 170 such that both enclaves are running on computing devices 110.

Figure 4:
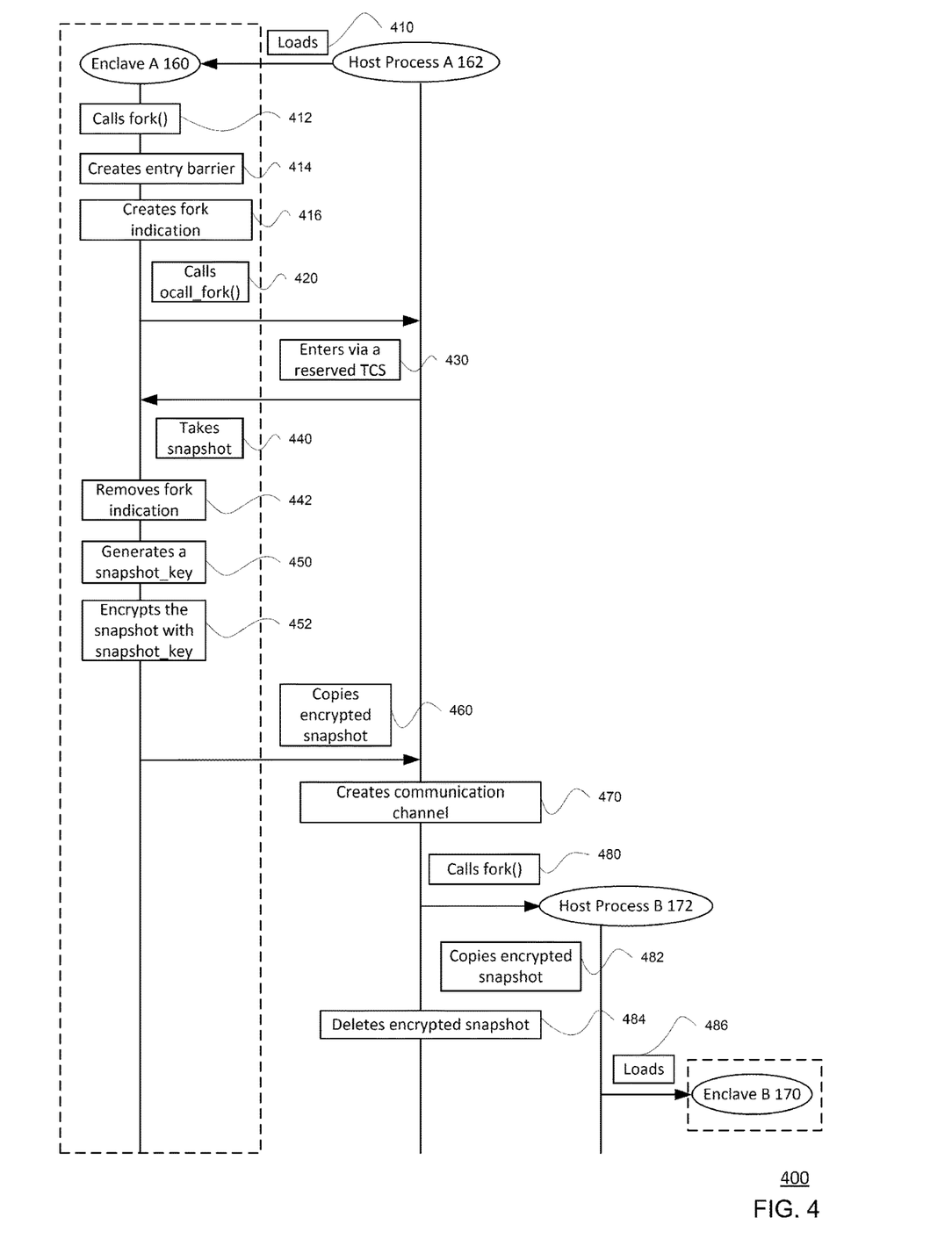
FIG. 4 an example timing diagram illustrating taking a snapshot in accordance with aspects of the disclosure.
Figure 5A:
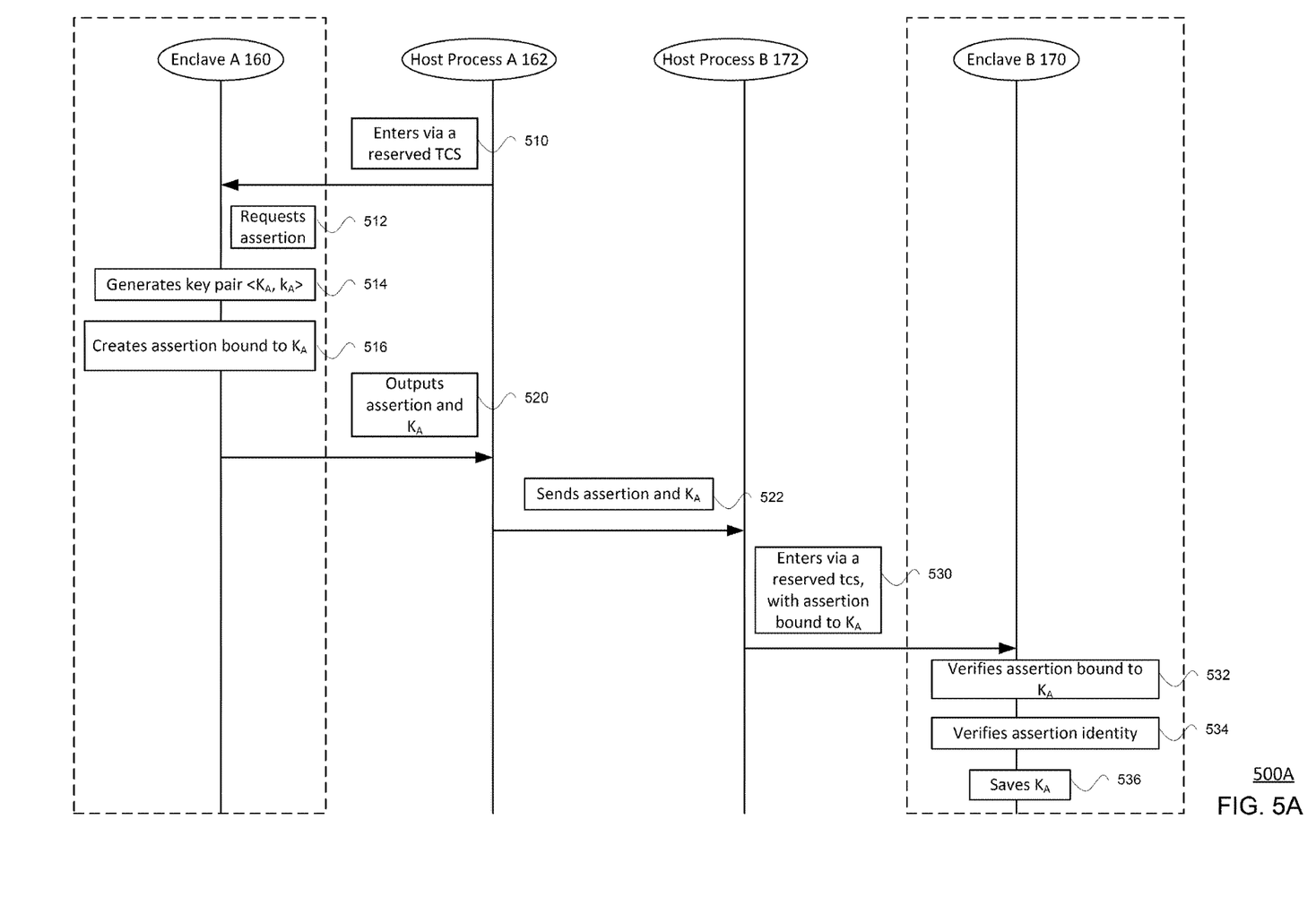
FIGS. 5A and 5B are example timing diagrams illustrating attestation and authentication in accordance with aspects of the disclosure.
Figure 5B:
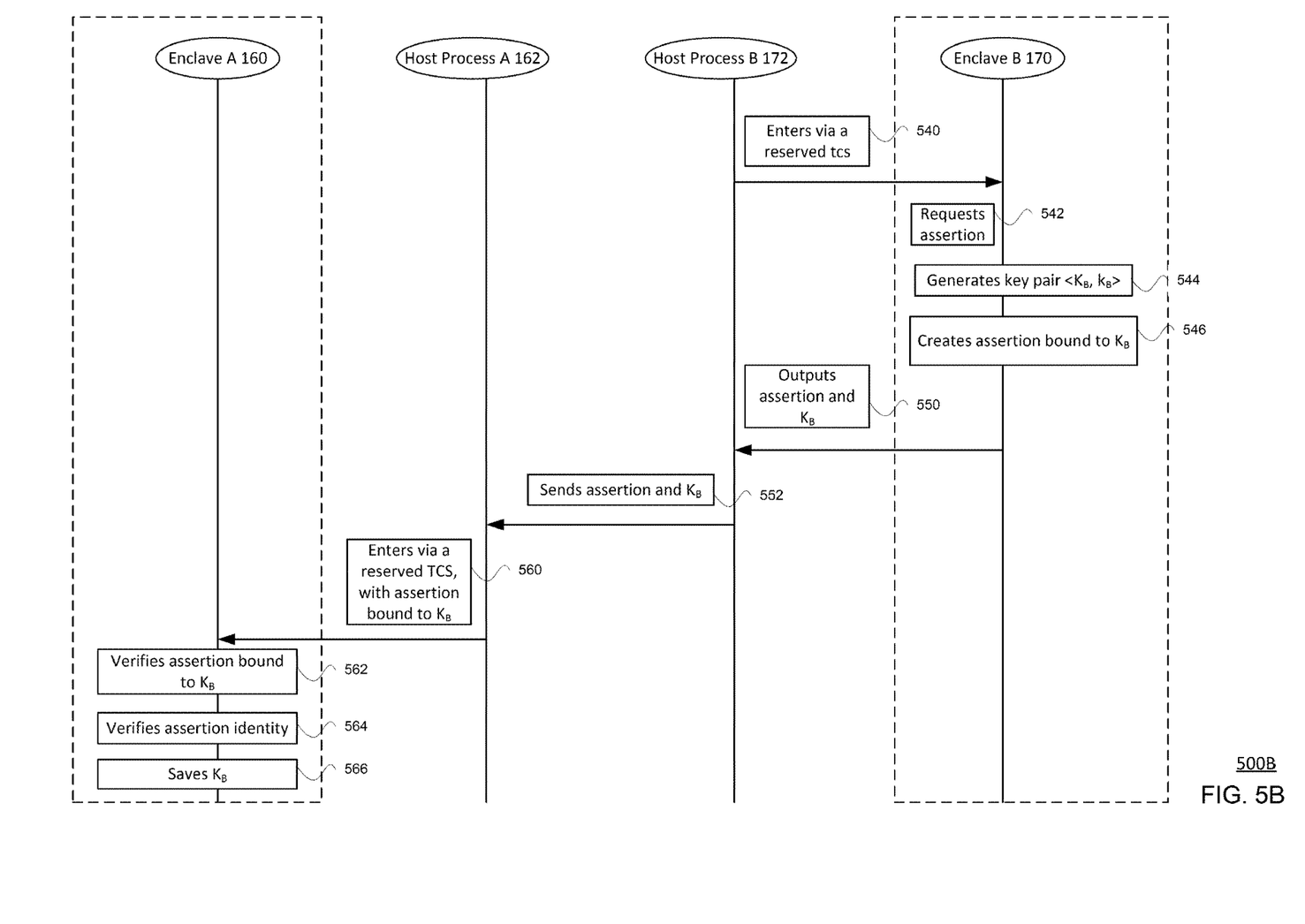
Figure 6:
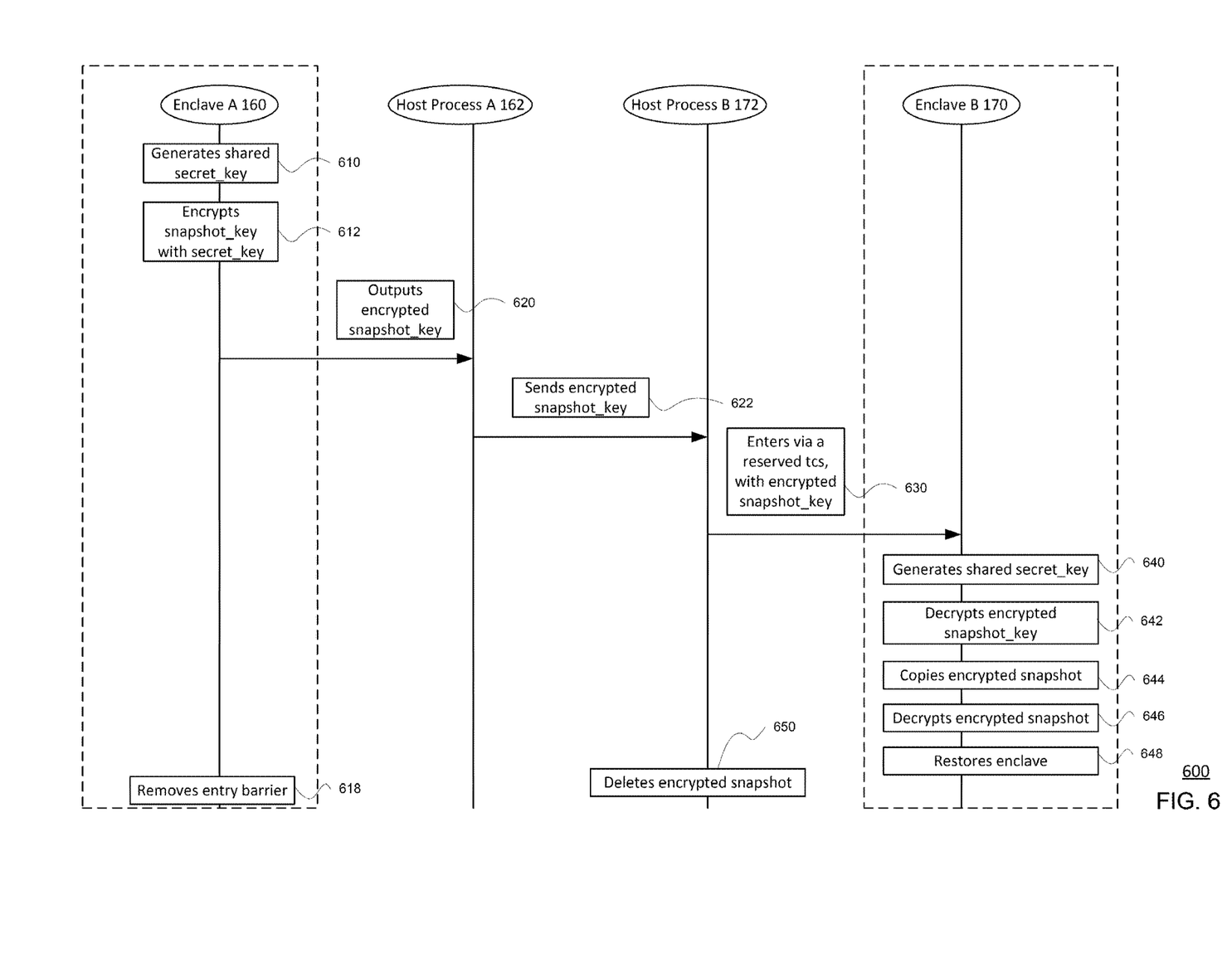
FIG. 6 is an example timing diagram illustrating restoring an encrypted snapshot in accordance with aspects of the disclosure.

FIGS. 4-6 show example timing diagrams 400, 500A, 500B, and 600, respectively, which help illustrate example implementations of the flow diagram 300 for forking an application in an enclave. As such, FIGS. 4-6 are discussed in conjunction with FIG. 3 for ease of illustration, but it is understood that the flow diagram 300 is not limited to an implementation with the example operations of FIGS. 4-6. The blocks in FIGS. 4-6 contain brief descriptions of example operations discussed further below, and the arrows represent the flow of data, code, message, or information between various components. The example operations shown in FIGS. 4-6 may be performed by one or more processors, such as the one or more processors 112 of computing devices 110.

Referring to FIG. 3, in block 310, a request to duplicate an application running inside a first enclave is received. For example, FIG. 4 shows a first enclave, Enclave A 160, being hosted by a first host process, Host Process A 162. For instance, at some point indicated by block 410, Host Process A 162 loaded Enclave A 160, for example, in order to allow an application to run securely inside Enclave A 160. While running, the application inside Enclave A 160 may need to create a duplicated instance of itself (i.e. the application). The duplicated instance of the application would begin with the same memory states as the original instance, but the two instances of the application would run separately and independently of each other thereafter. As such, in block 412 of FIG. 4, the application inside Enclave A 160 requests to fork, for example, by calling an enclave-side function fork( ) inside Enclave A 160. In this regard, fork( ) may represent the aforementioned PDXIS function call.

Referring back to FIG. 3, in order to make a duplicate of the application inside the enclave, in block 320, a snapshot of the first enclave including the application is generated. As mentioned above, fork( ) requires functionalities of the host to implement. As such, a thread running the application inside the first enclave may need to exit and request a host-side function to assist with certain steps of fork( ). For example, in block 420 of FIG. 4, a thread running the application inside Enclave A 160 exits Enclave A 160 to call a host-side function ocall_fork( ). This ocall_fork( ) may originate from Host Process A 162. To ensure security of data inside Enclave A 160, ocall_fork( ) remains outside Enclave A 160 and only performs operations on the untrusted memory of the host in support of the fork process.

However, since data inside an enclave is not visible outside of the enclave, the snapshot must be generated inside the enclave. As such, a thread needs to enter the first enclave to take the snapshot. In some examples, a new thread may be allowed to enter the first enclave for taking a snapshot. For example, the new thread may be assigned a new TCS reserved for forking, which may contain one or more entry points specifically defined for forking, such as an entry point to take a snapshot of the enclave. As noted above, this new TCS may be used for all fork related calls, or rather calls related to forking operations, entering the enclave. In block 430, a new thread with a new TCS reserved for forking may be allowed to enter Enclave A 160 to take a snapshot. For instance, this may be accomplished by ocall_fork( ) calling an ecall function EnterAndTakeSnapshot. Once inside, in block 440, this "snapshotting" thread takes a snapshot of Enclave A 160.

In some examples, the first enclave may set one or more flags to ensure security and accuracy of the snapshot. For instance, to prevent other host functions from entering the first enclave and modifying memory inside the first enclave while a snapshot is taken, which would cause inaccuracies in the snapshot (i.e., not exact copies), the first enclave may create an entry barrier. In this regard, as shown in block 414 of FIG. 4, in response to the enclave-side function fork( ) being called, the fork( ) function inside Enclave A 160 may create an entry barrier that blocks all entries into Enclave A 160 except for an entry to take snapshot in response to the fork request. Further, the entry barrier may only allow one snapshotting thread to enter Enclave A 160. By preventing multiple entries of threads, the entry barrier reduces the likelihood that an untrusted process or other thread may change the data within the Enclave A 160 during the forking process. The entry barrier may be removed upon completion of the fork, such as shown in block 618 (shown in FIG. 6).

For another instance, to prevent leakage of sensitive data within the first enclave, the first enclave needs to ensure that the fork request actually originated from an application inside the first enclave, and not from an untrusted process of the untrusted host. In this regard, as shown in block 416, in response to the enclave-side function fork( ) being called inside Enclave A 160, the fork( ) function inside Enclave A may create a fork indication indicating that fork is in progress for Enclave A 160, and that a snapshot may be taken of Enclave A 160. In some examples, the fork indication may be removed by the first snapshotting thread that enters Enclave A 160. Once the fork indication is removed, the first snapshotting thread may then be allowed to take a snapshot of Enclave A 160. This way, it is ensured that only one snapshot can be taken by only one snapshotting thread, and that another snapshotting thread, even if somehow entered into Enclave A 160, cannot take a second snapshot of Enclave A 160. Alternatively, the fork indication may be removed upon completion of the snapshot, such as shown in block 442.

Referring back to FIG. 3, in block 330, the snapshot is encrypted with a snapshot key inside the first enclave. This is to ensure that, when the snapshot is copied outside of the first enclave, the untrusted host cannot access data inside the snapshot, which may contain sensitive information. For example, as shown in FIG. 4, in block 450, Enclave A 160 generates snapshot_key. In block 452, Enclave A 160 then encrypts the snapshot with snapshot_key, resulting in an encrypted snapshot. The generation of snapshot_key and encryption of the snapshot may be implemented as part of an ecall, such as the aforementioned EnterAndTakeSnapshot.

Referring back to FIG. 3, in block 340, the encrypted snapshot is copied to the untrusted memory of the untrusted host. This way, functionalities of the untrusted host may support further steps of the fork. For example, as shown in FIG. 4, in block 460, the aforementioned snapshotting thread exits Enclave A 160, and allows ocall_fork( ) to copy the encrypted snapshot to untrusted memory allocated to Host Process A 162. Because the snapshot key remains inside the first enclave, the untrusted host does not have the snapshot key to decrypt the encrypted snapshot. Therefore, processes in the untrusted host cannot access data inside the encrypted snapshot even when the encrypted snapshot is in untrusted memory.

Referring back to FIG. 3, in block 350, a second enclave is generated. As mentioned above, this ensures that the duplicated application runs in the same secure environment as the original application. For example, as shown in FIG. 4, in block 480, ocall_fork( ) may call a host-side function fork( ) to create a second host process, such as Host Process B 172. In block 486, Host Process B 172 loads Enclave B 170. For example, Enclave B 170 may have the same identity and virtual memory as Enclave A 160.

In some examples, the host-side function fork( ) called in block 480 may additionally be used to affect other operations. For instance, a communication channel may be established between Host Process A 162 and Host Process B 172 using the host-side function fork( ). For example, before calling the host-side function fork( ), in block 470, Host Process A 162 may create one socket of a communication socket pair inside Host Process A 162. Once the host-side function fork( ) is called to generate Host Process B 172, the socket is copied into Host Process B 172, thus generating a second socket of the communication pair inside Host Process B 172. As such, the socket in Host Process A 162 and the socket in Host Process B 172 may establish a communication channel between Host Process A 162 and Host Process B 172. Since the communication channel is formed between two processes of the untrusted host, the communication channel may be an insecure communication channel.

For another instance, as a consequence of the host-side function fork( ) being called, in block 482, the encrypted snapshot stored in untrusted memory allocated to Host Process A 162 may be copied into untrusted memory allocated to Host Process B 172. Optionally, as shown in block 484, Host Process A 162, via ocall_fork, may delete the encrypted snapshot once the encrypted snapshot is copied into memory allocated to Host Process B 172.

For still another instance, as described in more detail below with respect to FIGS. 5A and 5B, as a consequence of the host-side function fork( ) being called, Host Process A 162 and Host Process B172 may each run a same set of attestation and authentication codes to allow the two enclaves to verify each other's identities before establishing a secure communication channel.

At this point, even if the encrypted snapshot is copied from the untrusted memory into the second enclave, the second enclave would not be able to decrypt the encrypted snapshot, and thus would not be able to access the data inside the snapshot to make itself a duplicate of the first enclave. This is because the second enclave does not have access to the snapshot key, which still exists exclusively inside the first enclave. However, sending the snapshot key between the first and second enclaves would necessarily involve the host, which cannot be trusted with the snapshot key. To address this, the fork support further provides security safeguards for sending the snapshot key between the two enclaves. As such, referring back to FIG. 3, in block 360, the snapshot key is sent from the first enclave to the second enclave through a secure communication channel.

FIGS. 5A and 5B show an example implementation of attestation and mutual authentication before establishing a secure communication channel between the two enclaves. Referring to FIG. 5A, in block 510, a thread may be allowed to enter Enclave A 160 through a reserved TCS to assist Enclave A 160 to generate an attestation of its identity. For instance, this may be accomplished by ocall_fork( ) calling an ecall function EnterAndAttest. In some examples, this "attesting" thread may be the aforementioned snapshotting thread, which had earlier exited Enclave A 160 after taking the snapshot in block 440 of FIG. 4. As such, the reserved TCS may be the same reserved TCS as described in block 430 of FIG. 4. By using the same thread and thus the same reserved TCS with multiple entry points, the fork support may prevent accidental modification of the memory of the original thread, which could cause a difference between the forked enclave and the original enclave (e.g. between Enclave A 160 and Enclave B 170). This may thus ensure consistency between the original enclave and the forked enclave. This may also address situations in which all TCS, which may be limited in number, are used up for other functions Once inside, in block 512, the attesting thread requests Enclave A 160 to generate a first assertion. In response to the request, in block 514, Enclave A 160 generates, for example, a first key pair including a first public key paired with a first private key <KA, kA>. While the first public key KA may leave Enclave A 160, the first private key kA remains inside Enclave A 160. In block 516, Enclave A 160 generates a first assertion of its identity, for instance, using Assertion Generator 210 and using the first public key KA as additional input data bound to the first assertion.

Next, in block 520, the attesting thread exits Enclave A 160 and outputs the first assertion of Enclave A 160 and the first public key KA to Host Process A 162. In block 522, Host Process A 162 then sends the first assertion and the first public key KA to Host Process B 172. For example, the outputting and sending of the first assertion in blocks 520 and 522 may be implemented as part of an ocall, such as the aforementioned ocall_fork( ).

Next, in block 530, a thread may be allowed to enter Enclave B 170 through a reserved TCS to assist Enclave B 170 to authenticate Enclave A by verifying the first assertion of Enclave A's 160 identity. For instance, this may be accomplished by ocall_fork( ) calling an ecall function EnterAndAuthenticate. In some examples, this "authenticating" thread may be the aforementioned attesting thread, which may also be the aforementioned snapshotting thread. As such, the reserved TCS may be the same reserved TCS as described in block 430 of FIG. 4. By using the same thread and thus the same reserved TCS, the fork support enables more efficient use of system resources than using multiple threads and TCSs.

Once inside, in block 532, the authenticating thread requests Enclave B 170 to verify that the first assertion is bound to public key KA, which Enclave B 170 may either verify to be true or false, for instance, using Assertion Verifier 222. Further, in block 534, the authenticating thread requests Enclave B 170 to verify that the first assertion is bound to Enclave A's 160 identity, which Enclave B 170 may either verify to be true or false, for instance, using Assertion Verifier 222. As mentioned above in block 486 of FIG. 4, if Enclave B 170 was created with the same identity as Enclave A 160, Enclave B 170 would be able to verify when the first assertion is a valid assertion of Enclave A 160, since it would also be a valid assertion of Enclave B's 170 own identity, which Enclave B 170 knows. If so, in block 536, Enclave B 170 stores the first public key KA. This way, the series of steps in FIG. 5A effectively enables Enclave B 170 to authenticate Enclave A. In other words, Enclave B 170 is able to verify that it is indeed communicating with Enclave A 160, because Enclave B 170 should not set up a secure channel with just any other enclave. Enclave B is also able to verify that the first public key KA is bound to Enclave A 160, and save the first public key KA for engaging in secure communication with Enclave A 160.

FIG. 5B shows a corresponding series of steps as FIG. 5A, which enables Enclave B 170 to send the second public key KB to Enclave A 160. In block 540, a thread may be allowed to enter Enclave B 170 through a reserved TCS to assist Enclave B 170 to generate an attestation of its identity. For instance, this may be accomplished by ocall_fork( ) calling an ecall function EnterAndAttest. In some examples, this attesting thread may be the aforementioned snapshotting/ attesting/authenticating thread. As such, the reserved TCS may be the same reserved TCS as described in block 430 of FIG. 4. By using the same thread and thus the same reserved TCS, the fork support enables more efficient use of system resources than using multiple threads and TCSs.

Once inside, in block 542, the attesting thread requests Enclave B 170 to generate a second assertion. In response to the request, in block 544, Enclave B 170 generates, for example, a second key pair including a second public key paired with a second private key <KB, kB>. While the second public key KB may leave Enclave B 170, the second private key kB remains inside Enclave B 170. In block 546, Enclave B 170 generates a second assertion of its identity, for instance, using Assertion Generator 220 and using the second public key KB as additional input data bound to the second assertion.

Next, in block 550, the attesting thread exits Enclave B 170 and outputs the second assertion of Enclave B 170 and the second public key KB to Host Process B 172. In block 552, Host Process B 172 then sends the second assertion and the second public key KB to Host Process A 162. For example, the outputting and sending of the first assertion in blocks 550 and 552 may be implemented as part of an ocall, such as the aforementioned ocall_fork( ).

Next, in block 560, a thread may be allowed to enter Enclave A 160 through a reserved TCS to assist Enclave A 160 to authenticate Enclave B by verifying the second assertion of Enclave B's 170 identity. For instance, this may be accomplished by ocall_fork( ) calling an ecall function EnterAndAuthenticate. In some examples, this authenticating thread may be the aforementioned snapshotting, attesting, and/or authenticating thread. As such, the reserved TCS may be the same reserved TCS as described in block 430 of FIG. 4. By using the same thread and thus the same reserved TCS, the fork support enables more efficient use of system resources than using multiple threads and TCSs.

Once inside, in block 562, the authenticating thread requests Enclave A 160 to verify that the second assertion is bound to public key KB, which Enclave A 160 may either verify to be true or false, for instance, using Assertion Verifier 220. Further, in block 564, the authenticating thread requests Enclave A 160 to verify that the second assertion is bound to Enclave B's 170 identity, which Enclave A 160 may either verify to be true or false, for instance, using Assertion Verifier 220. As mentioned above in block 486 of FIG. 4, if Enclave B 170 was created with the same identity as Enclave A 160, Enclave A 160 would be able to verify that the second assertion is a valid assertion of Enclave B 170, since it would also be a valid assertion of Enclave A's 160 own identity, which is known to Enclave A 160. If so, in block 566, Enclave A 160 stores the second public key KB. This way, the series of steps in FIG. 5B effectively enables Enclave A 160 to authenticate Enclave B. In other words, Enclave A 160 is able to verify that it is indeed communicating with Enclave B 170, because Enclave A 160 should not set up a secure channel with just any other enclave. Enclave A 160 is also able to verify that the second public key KB is bound to the identity of Enclave B 170, and save the second public key KB for engaging in secure communication with Enclave B 170.

Thus, through these attestation and authentication steps described in FIGS. 5A and 5B, which may function similar to a handshake, Enclave A 160 is equipped with the first key pair <KA, ka> and second public key KB of Enclave B 170. Likewise, Enclave B 170 is equipped with the second key pair <KB, kb> and the first public key KA of Enclave A 160. As such, the two enclaves may use these keys to derive a shared key that may be used to encrypt and decrypt data sent between them, thereby establishing a secure communication channel.

In some examples, the first and second key pairs may be Diffie-Hellman key pairs, which means that a shared secret between Enclave A 160 and Enclave B 170 can be generated by Enclave B 170 using KA and kB and independently by Enclave A 160 using KB and kA. For example, the shared secret may be generated using elliptic-curve cryptography. This shared secret may be used as an input into a key derivation function ("KDF"), such as HKDF, to derive a symmetric secret key. That is, Enclave A 160 may use KB and kA to derive the same symmetric secret key as Enclave B 170 would using KA and kB. The KDF can also take additional context information from the handshake of FIGS. 5A and 5B, such as a hash of the handshake transcript, which contains the assertions exchanged between the two enclaves, as an input into the secret key derivation process. This would provide the property that the derived secret key is cryptographically tied to the identities exchanged of Enclave A 160 and Enclave B 170, and verified during the handshake of FIGS. 5A and 5B, as well as any random values that were exchanged earlier in the handshake to establish session uniqueness.

Referring back to FIG. 3, once a secure communication channel is established between the two enclaves, in block 360, the snapshot_key is passed from the first enclave to the second enclave through the secure communication channel. For example, as shown in FIG. 6, in block 610, a secret_key is generated inside Enclave A 160 using KB and ka, which may be the public key from the Diffie-Hellman key pair generated by Enclave B 170 and the private key from the Diffie-Hellman pair generated by Enclave A 160. For example, block 610 may be performed by the thread that entered into Enclave A 160 in block 560. Alternatively, block 610 may be performed by a thread allowed to enter through a reserved TCS, for example through an ecall function such as EnterAndEncrypt. As described above, such a thread may be a new thread entering through a new TCS, or the same snapshotting/attesting/authenticating thread entering through the same TCS as in block 430. In block 612, Enclave A 160 encrypts snapshot_key with the secret_key.

Once encrypted, in block 620, the encrypted snapshot_key is outputted to Host Process A 162. In block 622, the encrypted snapshot_key is sent from Host Process A 162 to Host Process B 172 through the communication channel established in blocks 460 and 470. Since the host does not have access to the secret_key, sending of the encrypted snapshot_key in blocks 620 and 622 may be performed by host-side function ocall_fork( ).

Next, in block 630, a thread is allowed to enter Enclave B 170 through a reserved TCS, along with the encrypted snapshot_key. For example, ocall_fork( ) may call an ecall function EnterAndRestore to allow the thread to enter Enclave B 170. As described above, the thread may be a new thread entering through a new TCS, or the aforementioned snapshotting, attesting, authenticating, and/or encrypting thread entering through the reserved TCS of block 430. In block 640, Enclave B 170 generates the shared secret_key, for example using KA and kB, which may be the public key from the Diffie-Hellman key pair generated by Enclave A 160 and the private key from the Diffie-Hellman pair generated by Enclave B 170 as described above. In block 642, Enclave B 170 decrypts the encrypted snapshot_key using the secret_key, to recover the snapshot_key.

At this point, restoration of the snapshot needs to be performed inside the second enclave so that the second enclave may duplicate an instance of the original application running inside the first enclave. As such, referring back to FIG. 3, in block 370, the encrypted snapshot is copied into the second enclave. Then in block 380, the encrypted snapshot is decrypted inside the second enclave with the snapshot_key to restore the snapshot inside the second enclave.

For example, referring to FIG. 6, in block 644, the encrypted snapshot stored in untrusted memory allocated to Host Process B 172 is copied into Enclave B 170. In block 646, Enclave B 170 decrypts the encrypted snapshot using the snapshot_key, to recover the snapshot. In block 648, Enclave B 170 restores data in the snapshot to Enclave B 170, thereby creating a duplicated instance of the application running inside Enclave A 160, which requested the fork. For instance, blocks 644, 646, and 648 may each be implemented as part of the ecall EnterAndRestore. In addition, once the encrypted snapshot is copied to Enclave B 170, Host Process B 172 may also delete the encrypted snapshot at block 650.

Again, the features described herein provide a framework to implement fork( ) for an application running inside an enclave and thereby provide enclave fork support when the host would not actually have access to the information within the enclave. In other words without this framework, the Host would not be able to implement fork( ) for a process within an enclave at all because the Host would not have access to the information within the enclave. In addition, various safeguards are included to allow an untrusted host to assist in the forking process, without ever allowing the host access to data inside the enclave. By duplicating the enclave, the framework enables the duplicated application to run separately from the original application inside the same secure environment.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for duplicating an application running inside a first enclave of a host computing device, the method comprising:
   generating, by one or more processors of the host, a snapshot of the first enclave including the application;
   encrypting, by the one or more processors, the snapshot with a snapshot key inside the first enclave;
   generating, by the one or more processors, a secret key inside the first enclave;
   encrypting, by the one or more processors, the snapshot key with the secret key inside the first enclave;

sending, by the one or more processors, the encrypted snapshot key to a second enclave; and copying, by the one or more processors, the encrypted snapshot to the second enclave.

2. The method of claim 1, further comprising outputting, by the one or more processors, the encrypted snapshot key from the first enclave to a first process of the host.

3. The method of claim 1, further comprising establishing, by the one or more processors, a secure communication channel between the first enclave and the second enclave using the secret key.

4. The method of claim 3, wherein the encrypted snapshot key is sent to the second enclave through the secure communication channel.

5. The method of claim 1, wherein the secret key is a shared secret key between the first enclave and the second enclave.

6. The method of claim 1, wherein the encrypted snapshot is copied to untrusted memory allocated to a first process of the host.

7. The method of claim 6, further comprising copying, by the one or more processors, the encrypted snapshot from the untrusted memory allocated to the first process to untrusted memory allocated to a second process of the host.

8. The method of claim 1, further comprising restoring, by the one or more processors, data in the snapshot to the second enclave to create a duplicated instance of the application running inside the first enclave.

9. The method of claim 1, further comprising:
  decrypting, by the one or more processors, the encrypted snapshot key with a secret key inside the second enclave;
  decrypting, by the one or more processors, the encrypted snapshot with the snapshot key inside the second enclave; and
  deleting, by the one or more processors, the encrypted snapshot from untrusted memory in response to decrypting the encrypted snapshot inside the second enclave.

10. A system comprising:
  one or more processors; and
  one or more storage devices coupled to the one or more processors and storing instructions that, when executed by the one or more processors, cause the one or more processors to perform operations for duplicating an application running inside a first enclave of a host computing device, the operations comprising:
  generating a snapshot of the first enclave including the application;
  encrypting the snapshot with a snapshot key inside the first enclave;
  generating a secret key inside the first enclave;
  encrypting the snapshot key with the secret key inside the first enclave;
  sending the encrypted snapshot key to a second enclave; and
  copying the encrypted snapshot to the second enclave.

11. The system of claim 10, wherein the operations further comprise outputting the encrypted snapshot key from the first enclave to a first process of the host.

12. The system of claim 10, wherein the operations further comprise establishing a secure communication channel between the first enclave and the second enclave using the secret key.

13. The system of claim 12, wherein the encrypted snapshot key is sent to the second enclave through the secure communication channel.

14. The system of claim 10, wherein the secret key is a shared secret key between the first enclave and the second enclave.

15. The system of claim 10, wherein the encrypted snapshot is copied to untrusted memory allocated to a first process of the host.

16. The system of claim 15, wherein the operations further comprise copying the encrypted snapshot from the untrusted memory allocated to the first process to untrusted memory allocated to a second process of the host.

17. The system of claim 10, wherein the operations further comprise restoring data in the snapshot to the second enclave to create a duplicated instance of the application running inside the first enclave.

18. The system of claim 10, wherein the operations further comprise:
  decrypting the encrypted snapshot key with a secret key inside the second enclave;
  decrypting the encrypted snapshot with the snapshot key inside the second enclave; and
  deleting the encrypted snapshot from untrusted memory in response to decrypting the encrypted snapshot inside the second enclave.

19. A non-transitory computer readable medium for storing instructions that, when executed by one or more processors, cause the one or more processors to perform operations for duplicating an application running inside a first enclave of a host computing device, the operations comprising:
  generating a snapshot of the first enclave including the application;
  encrypting the snapshot with a snapshot key inside the first enclave;
  generating a secret key inside the first enclave;
  encrypting the snapshot key with the secret key inside the first enclave;
  sending the encrypted snapshot key to a second enclave; and
  copying the encrypted snapshot to the second enclave.

20. The system of claim 10, wherein the operations further comprise establishing a secure communication channel between the first enclave and the second enclave using the secret key, the encrypted snapshot key being sent to the second enclave through the secure communication channel.

* * * * *